United States Patent [19]

Huliba

[11] 4,318,114

[45] Mar. 2, 1982

[54] INK JET PRINTER HAVING CONTINUOUS RECIRCULATION DURING SHUT DOWN

[75] Inventor: David A. Huliba, Kettering, Ohio

[73] Assignee: The Mead Corporation, Dayton, Ohio

[21] Appl. No.: 187,003

[22] Filed: Sep. 15, 1980

[51] Int. Cl.³ .......... G01D 15/18

[52] U.S. Cl. .......... 346/140 R

[58] Field of Search .......... 346/140 R, 140 A, 140 PD, 346/140 IJ, 75

[56] References Cited

U.S. PATENT DOCUMENTS

| | | | |
|---|---|---|---|
| 3,371,350 | 2/1968 | Sanderson et al. | 346/140 R |
| 3,373,438 | 3/1968 | Hochberg | 346/75 |
| 3,661,304 | 5/1972 | Martinez et al. | 222/394 |
| 3,701,998 | 10/1972 | Mathis | 346/75 |
| 3,761,953 | 9/1973 | Helgeson et al. | 346/75 |
| 3,839,721 | 10/1974 | Chen et al. | 346/75 |
| 3,891,121 | 6/1975 | Stoneburner | 222/1 |
| 3,970,222 | 7/1976 | Duffield | 222/148 |
| 3,974,508 | 8/1976 | Blumenthal | 346/140 |
| 4,042,937 | 8/1977 | Perry et al. | 346/1 |
| 4,084,165 | 4/1978 | Skafvenstedt et al. | 346/140 IJ |

FOREIGN PATENT DOCUMENTS

| | | | |
|---|---|---|---|
| 2828998 | 1/1980 | Fed. Rep. of Germany | 346/75 |

OTHER PUBLICATIONS

Ink Jet Head, R. E. Pelkie et al., *IBM Technical Disclosure Bulletin,* vol. 18, No. 10, Mar. 1976, pp. 3206–3207.

Fast Liquid Valve, Giordano et al., *IBM Technical Disclosure Bulletin,* vol. 19, No. 6, Nov. 1976, pp. 2313–2314.

Fluid Circuit for Fast Startup of an Ink Jet Head, Brady et al., *IBM Disclosure Bulletin,* vol. 17, No. 5, Oct. 1974, p. 1524.

*Primary Examiner*—Donald A. Griffin

*Attorney, Agent, or Firm*—Biebel, French & Nauman

[57] ABSTRACT

An ink jet printer includes a fluid supply system for supplying ink through the print head of the printer. The fluid supply system includes a pump arrangement supplying ink to the print head from a supply tank via a fluid supply line. A plurality of ink return lines are connected between the pump outlet and the pump inlet. Each of the ink return lines includes a flow restriction, with the flow restriction in each line providing a fluid flow impedance which differs from the impedances provided by the other flow restrictions. A valve arrangement connects the pump outlet to selected ones of the ink return lines, to provide means for controlling the flow rate of ink supplied through the ink supply line to the print head. During periods in which the printer is shut down, a substantially reduced ink flow through the print head is continuously maintained at a reduced fluid flow rate and at a reduced fluid pressure.

9 Claims, 1 Drawing Figure

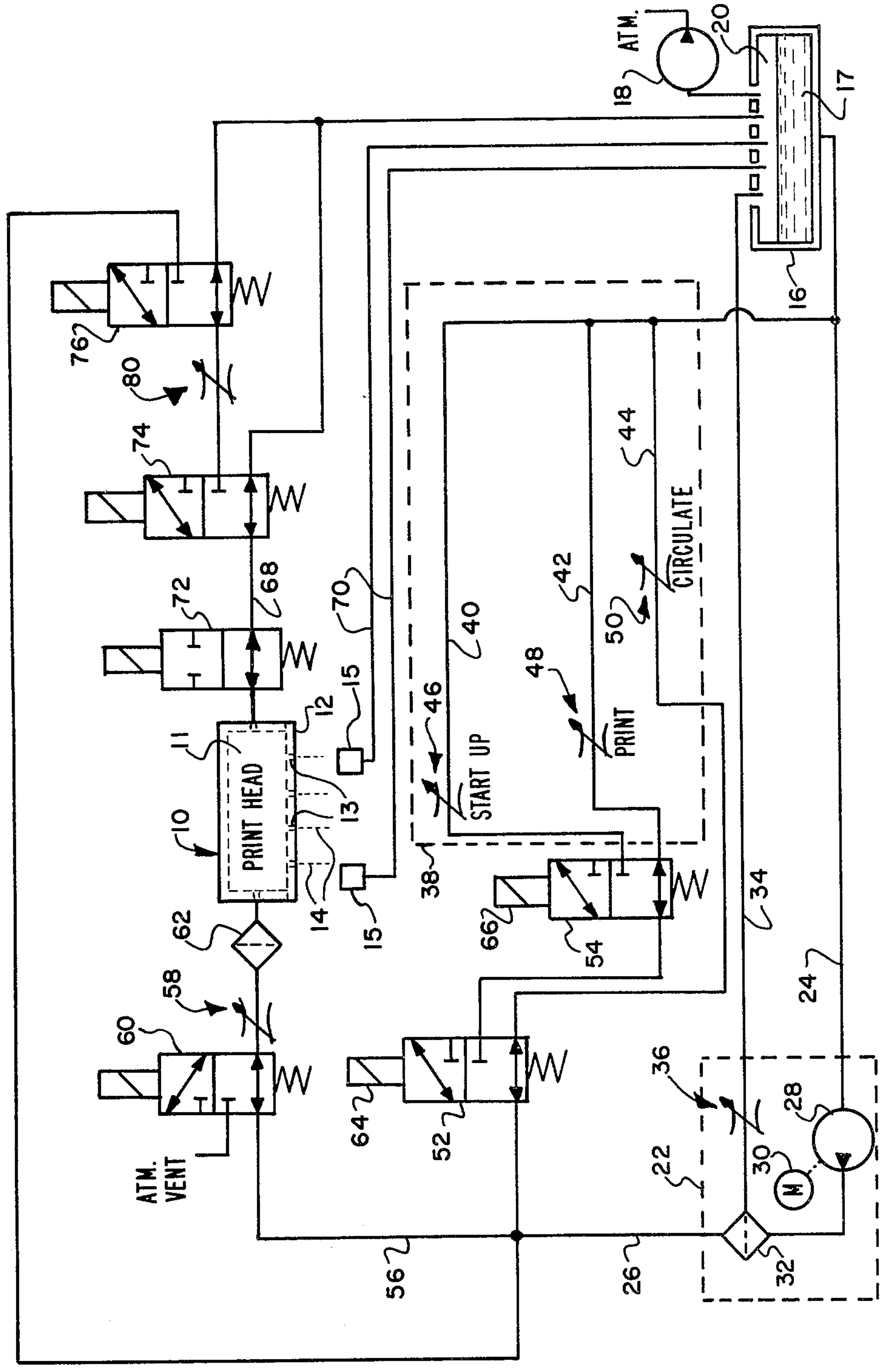
ATM.
PRINT HEAD
START UP
PRINT
CIRCULATE
ATM. VENT
M
10
11
12
13
14
15
16
17
18
20
22
24
26
28
30
32
34
36
38
40
42
44
46
48
50
52
54
56
58
60
62
64
66
68
70
72
74
76
80

INK JET PRINTER HAVING CONTINUOUS RECIRCULATION DURING SHUT DOWN

The present application is related to U.S. patent application Ser. No. 178,325, filed Aug. 15, 1980, and assigned to the assignee of the present application.

BACKGROUND OF THE INVENTION

The present invention relates to ink jet printers and, more particularly, to an ink jet printer and method of printer shut down in which ink is maintained within the print head during periods of time in which the printer is shut down.

A number of different types of ink supply systems have been utilized in the past for supplying ink under pressure to the print head of an ink jet printer. Typically, the print head defines a fluid reservoir to which ink is supplied under pressure and at least one orifice communicating with the reservoir. Ink flows through the orifice and forms a fluid filament. Mechanical disturbances are applied to the fluid filament, as for example by means of a piezoelectric transducer, to stimulate the filament to break up into a jet drop stream. As drops are formed from the fluid filament, the drops are selectively charged and, thereafter, are deflected by an electrostatic field such that they are separated into print and catch trajectories. The drops in the print trajectories strike a print receiving medium, such as a paper web, while the drops in the catch trajectories are directed to a drop catcher, which ingests the drops and returns them to the ink supply system for reuse. One such prior art printer is shown in U.S. Pat. No. 3,701,998, issued Oct. 31, 1972, to Mathis.

One type of ink jet printer fluid supply system is shown in U.S. Pat. No. 3,761,953, issued Sept. 25, 1973, to Helgeson. The Helgeson system includes a fluid recirculation path from a fluid pump to a pressure regulation tank and back to the pump. Fluid is withdrawn from the presssure regulation tank and supplied to the print head. Ink in the recirculation path is replenished from a supply tank.

A significant problem encountered with ink jet printers is the difficulty of providing a start up of the printer in which the jet drop streams are formed without wetting other printer components. As the flow of ink through the print head orifices begins, the jet drop streams initially established tend to be somewhat unstable, both in trajectory and in drop size. This instability may also reappear at shut down of the printer as the fluid flow through the orifices is terminated.

U.S. Pat. No. 4,042,937, issued Aug. 16, 1975, to Perry et al, discloses an ink supply system in which sequencing of purging, start up, print operation, and shut down of the printer are controlled by a pair of solenoid-actuated valves connected in the inlet and outlet lines of the print head. The inlet valve is connected between a pump and the print head, while the outlet valve is connected between the print head and the supply tank which provides ink to the pump. Start up is accomplished by filling the print head with ink, closing the inlet valve to permit pressure to build behind the inlet valve to a level significantly greater than that required for operation and, thereafter, opening the inlet valve. At shut down, the inlet valve is closed while the outlet valve is held open, thus creating a negative pressure in the head. The pump is then turned off.

Ink is maintained within the print head during the period of time in which the printer is shut down. Perry et al suggests that it may be desirable to purge the print head of air bubbles subsequent to shut down to prevent drying of ink inside the print head. Nevertheless, drying of ink and precipitation of particulate contaminants may occur within the print head during protracted shut down periods, with the result that the print head nozzles or orifices may become clogged. Additionally, there is the possibility that ink may weep through the nozzles during periods of shut down, producing undesirable wetting of various printer elements.

Other types of ink jet printers have included a provision for removing all ink from the print head reservoir during periods of printer shut down in order to minimize clogging of the print head orifices. This necessarily complicates start up and shut down of the printer, however. U.S. Pat. No. 3,970,222, issued July 20, 1976, to Duffield, discloses an ink jet printer start up method in which ink is supplied under pressure to the initially dry print head reservoir to compress the air in the reservoir. This, in turn, raises the pressure of the ink. Compression of the air continues until the ink reaches the first orifice in a row of orifices, at which time the pressure within the print head is in excess of the required start up pressure. Ink flows through the first orifice and, in succession, through each of the other orifices of the print head.

U.S. Pat. No. 3,891,121, issued June 24, 1975, to Stoneburner, discloses a start up method in which the print head manifold, initially dry, is pre-pressurized with air and a flushing liquid before supplying ink to the manifold. At shut down of the printer, the flow of ink to the print head manifold is replaced with a flow of flushing fluid. The flow of flushing fluid is then terminated and, simultaneously, an evacuation line leading to a low pressure source is opened, removing fluid from the manifold. The manifold is thereafter maintained in a dry condition until start up of the printer is subsequently initiated.

In order to avoid the difficulties encountered in start up of a print head of the type from which ink is removed during shut down periods, while at the same time eliminating the possibility of ink drying in the print head nozzles and clogging the nozzles, as may occur with printers of the type in which ink is maintained within the print head during shut down periods, U.S. Pat. No. 3,839,721, issued Oct. 1, 1974, to Chen et al discloses a printer arrangement having a liquid filled container which is movable with respect to the jet nozzles. The container, filled with water or water containing detergent, submerges the print head nozzles during shut down periods and prevent drying of ink within the nozzles. This permits ink to be maintained within the print head mainfold during periods of printer shut down. In an alternative embodiment, the nozzles are submerged in a mist or vapor which prevents ink drying. The liquid filled container for submerging the nozzles and the mechanical arrangement for moving the container add significantly to the size and cost of the printer. Additionally, contaminants in the ink within the print head may settle during periods of printer shut down, causing the nozzles to become clogged.

Accordingly, it is seen that there is a need for an ink jet printer of simple, reliable design, capable of maintaining ink within the printer print head during shut down periods without the ink drying and without particle deposition which could cause the print head orifices to become clogged. Such a printer should also be configured to prevent weeping of ink through the print head orifices during shut down periods.

SUMMARY OF THE INVENTION

An ink jet printer has a print head including a fluid receiving reservoir, and an orifice plate defining at least one orifice communicating with the reservoir for providing ink flow through the orifice to form a jet drop stream for printing. A fluid supply means includes an ink supply tank and pump means connected to the ink supply tank. A print head supply line means provides flow of ink from the fluid supply means to the fluid receiving reservoir of the print head. A print head return line means returns ink from the fluid receiving reservoir of the print head to the fluid supply means. A control means controls the flow of ink supplied to the print head by the fluid supply means to provide a flow of ink at a predetermined flow rate during printing, and to provide a substantially reduced continuous flow of ink from the print head supply line means to the print head return line means through the reservoir at a substantially reduced fluid pressure during periods in which the printer is shut down and a jet drop stream is not produced by the print head. Ink is continuously circulated through the print head reservoir without weeping of ink through the orifice, drying of ink adjacent the orifice, or deposit of contaminants within the reservoir.

The fluid pressure of the ink within the fluid receiving reservoir may be less than 0.5 psia during printer shut down. The fluid flow rate of ink through the print head may be on the order of 0.02 gallons per minute during printer shut down.

A method of shutting down an ink jet printer of the type having a print head including an ink receiving reservoir and an orifice plate defining at least one orifice communicating with the reservoir, a jet drop stream being produced by ink flow through the orifice when ink is supplied to the reservoir at a predetermined pressure, comprises the steps of:

(a) reducing the fluid pressure in the reservoir below the predetermined pressure such that ink does not flow through the orifice, thereby terminating formation of the jet drop streams, and (b) providing continuous flow of ink through the reservoir during periods of time in which a jet drop stream is not produced by the print head, whereby contaminants in the ink do not settle within the reservoir and ink is prevented from drying in the region of the orifice, thereby preventing the orifice from becoming clogged.

The continuous flow of ink through the reservoir is maintained in a direction substantially normal to the direction of fluid flow through the orifice. The step of providing a continuous flow of ink through the reservoir may include the step of continuously recirculating ink through the reservoir from a fluid supply means, whereby contaminants remain entrained in the ink and do not clog the orifice.

Accordingly, it is an object of the present invention to provide an ink jet printer and method of printer shut down in which ink is continuously circulated through the printer print head during shut down periods to preclude deposit of contaminants within the print head and drying of the ink therein; to provide such a printer and method of shut down in which the flow rate of fluid supplied to the print head during shut down periods is substantially less than the flow rate of ink supplied to the print head during printing operations; to provide such a printer and method of shut down in which the fluid pressure of ink within the print head during periods of shut down is substantially less than that during printing operations; and to provide such a printer and method of printer shut down in which ink is continuously recirculated between the print head and an ink supply.

Other objects and advantages of the invention will be apparent from the following description, the accompanying drawings and the appended claims.

BRIEF DESCRIPTION OF THE DRAWING

The FIGURE is a schematic representation of an ink jet printer constructed according to the present invention.

DETAILED DESCRIPTION OF THE PREFERRED EMBODIMENTS

Reference is made to the single FIGURE which depicts diagrammatically the ink jet printer of the present invention. A fluid supply means provides ink to the print head 10 of an ink jet printer for production of jet drop streams in a known manner. Print head 10 may be any one of a number of known prior art print heads, such as shown in U.S. Pat. No. 3,701,998, issued Oct. 31, 1972, to Mathis. Print head 10 includes a fluid receiving reservoir 11 and an orifice plate 12 defining orifices 13 communicating with the reservoir 11 for providing ink flow therethrough producing a plurality of jet drop streams 14 of ink for deposit on a print receiving medium. Drops which are not to be deposited upon the print receiving medium are selectively charged by charging electrodes (not shown) and electrically deflected to one or more drop catchers 15 for reuse by the fluid supply system. A fluid supply means includes an ink supply tank 16 which stores a quantity of ink 17 therein. Supply tank 16 includes vacuum pump 18 which partially evacuates the air space 20 above the ink 17; so as to maintain the ink 17 at a subatmospheric pressure. This tends to reduce foaming of the ink 17 and to remove air bubbles from the ink prior to application of the ink to the print head 10.

The fluid supply means further includes pump means 22, having a pump inlet 24 and a pump outlet 26, receives ink from the ink supply tank 16 at the pump inlet 24 and provides ink under pressure at the pump outlet 26. The pump means 22 includes a pump 28 powered by an electric motor 30. The pump means 22 further includes a filter 32 which is connected to the output of the pump 28 and filters the ink supplied to pump outlet 26. In order to remove any air which may accumulate within the filter 32, a bleed line 34, including a bleed restriction 36, returns to the supply tank 16 a small portion of the ink supplied to the filter 32, as well as any air which may be trapped within the filter 32.

Ink recirculation means 38 includes a plurality of ink return lines 40, 42, and 44 for returning ink from the pump outlet 26 to the pump inlet 24, and each of the ink return lines includes a flow restriction means. The first ink return line includes a start up flow restriction means 46, the second ink return line 42 includes a print flow restriction means 48, and the third ink return line 44 includes a circulate flow restriction means 50. Flow restriction means 46, 48, and 50, each include a manually adjustable valve which provides a fluid flow impedance therethrough. The start up flow restriction means 46 provides a fluid flow impedance therethrough which is greater than that of the print flow restriction means 48, while the circulate flow restriction means 50 provides a fluid flow impedance therethrough less than that of the print flow restriction means 48.

A control means, including valves 52 and 54 selectively directs ink from the pump means 22 to selected ones of the ink return lines 40, 42, and 44. A print head supply line means 56, including supply flow restriction means 58 and print head inlet valve 60, supplies ink from the pump means 22 to the print head 10. A filter 62 may also be provided in the print head supply line means 56.

Solenoid means 64 and 66 are provided for controllably actuating associated valves 52 and 54, respectively, such that a portion of the ink from the pump outlet 26 is returned to the pump inlet 24 through a solenoid one of the ink return lines 40, 42, and 44. The remainder of the ink from the pump means 22 is supplied to the print head 10 through the print head supply line means 56. As a consequence, the flow rate of ink supplied to the print head is controlled by selecting an appropriate one of the flow restriction means 46, 48, and 50 through which a portion of the output of the pump means 22 is recirculated to the pump inlet 24. The balance of the ink from the pump outlet 26 is applied to the print head 10. It will be appreciated that when an ink return line having a flow restriction therein which provides a substantial fluid flow impedance is selected, a greater portion of the ink output from the pump means 22 is supplied through the supply line means 56 to the print head than is the case when an ink return line having a lesser impedance flow restriction means is selected.

The supply system further includes a print head return line means 68 for returning ink from the print head 10 to the ink supply tank 16. Additionally, drops of ink which are caught by catchers 15 are returned to the supply tank 16 via lines 70. The print head return line means 68 includes a print head outlet valve 72 which permits ink flow therethrough or, alternatively, terminates ink flow from the print head 10 through the print head return line means 68.

Bleed valve means, including solenoid actuated valves 74 and 76, are provided for supplying ink from the pump means 22 to the side of the print head outlet valve 72 opposite the print head 10 prior to a bleeding operation, described below, in which the outlet valve 72 is opened to permit fluid flow through the print head.

An operational cycle for the ink supply system of the present invention is described in the following Table:

| Step | VALVE | | | | | | |
|---|---|---|---|---|---|---|---|
| No. | 52 | 54 | 60 | 74 | 72 | 76 | DESCRIPTION |
| 1 | 0 | 0 | 0 | 0 | 0 | 0 | Circulate/Shut Down |
| 2 | 1 | 0 | 0 | 0 | 0 | 0 | |
| 3 | 1 | 1 | 0 | 0 | 0 | 0 | |
| 4 | 1 | 1 | 0 | 0 | 1 | 0 | Start Up |
| 5 | 1 | 0 | 0 | 1 | 1 | 1 | |
| 6 | 1 | 0 | 0 | 1 | 0 | 1 | |
| 7 | 1 | 0 | 0 | 1 | 0 | 0 | Bleed |
| 8 | 1 | 0 | 0 | 1 | 1 | 0 | |
| 9 | 1 | 0 | 0 | 0 | 1 | 0 | Print |
| 10 | 1 | 0 | 1 | 0 | 0 | 0 | Shut Down |
| 11 | 0 | 0 | 1 | 0 | 0 | 0 | |
| 12 | 0 | 0 | 0 | 0 | 0 | 0 | Circulate/Shut Down |
| 13 | 0 | 0 | 1 | 0 | 0 | 0 | Bar Removal |

A "1" in the Table indicates that the solenoid associated with the valve is actuated, while a "0" indicates that the solenoid is not actuated.

Initially, as indicated at Step No. 1, the system is in a circulate mode of operation during periods of printer shut down. Print head inlet valve 60 and print head outlet valve 72 are not actuated, thereby producing fluid flow at a relatively low flow rate through the print head from the pump means 22, with the fluid being returned to the tank 16 via the print head return line 68. Ink is circulated through the reservoir 11 at a flow rate of approximately 0.02 gallons per minute and a fluid pressure is maintained within the reservoir of 0.5 psia or less. This flow rate, in a direction perpendicular to orifices, is sufficient to prevent contaminants in the ink from settling in the reservoir 11 and clogging the orifices 13. Additionally, by maintaining a fluid flow across the orifices, the ink in reservoir 11 does not tend to dry adjacent the orifices and blockage of the orifices by dried ink is prevented. Finally, by maintaining the fluid pressure within the print head very close to atmospheric pressure, the pressure differential across the orifice plate 12 is not sufficient to cause fluid flow through the orifices 13. As a consequence, weeping of ink from the orifices does not occur. It will be understood that such weeping would be highly undesirable in that electrical components could become wetted and short out. Additionally, quantities of ink would tend to collect on the bottom of the orifice plate 12 and would interfere with production of the jet drop streams 14.

No jet drop streams are produced by the print head 10 during this mode of operation. Valves 64 and 66 are not actuated at this time and, as a consequence, ink is recirculated through the third ink return line 44 and the circulate flow restriction 50. Since flow restriction 50 offers relatively little impedance to fluid flow through line 44, a substantial portion of the ink from the pump outlet 26 is returned through the ink recirculation means 38 to the pump inlet 24, and the flow rate of ink passing through the print head 10 is therefore relatively low. Thus, the printer may be maintained in the shut down mode for long periods of time without weeping of the ink through the print head orifices because of the relatively low flow rate to the print head 10, and the resulting low fluid pressure of the ink within the print head.

When operation of the printer is to be initiated, it is necessary to establish the flow of fluid filaments from the print head orifices to produce the jet drop streams. As seen in Step No. 2, valve 52 is actuated by solenoid means 64 such that ink is diverted to the second ink return line 42. Shortly thereafter, as seen in Step No. 3, valve 54 is actuated. This results in diverting ink from the pump means 22 through the ink return line 40 and the greater impedance provided by start up flow restriction means 46. The net effect of Step Nos. 2 and 3 is to reduce the flow rate of ink returned to the pump inlet 24 through the ink recirculation means 38, while simultaneously increasing the flow rate of ink supplied to the print head 10 by the print head supply line means 56. The flow rate of the ink through the print head 10 depends in part upon the ratio of the fluid flow impedance between supply flow restriction means 58 and other restrictions in line 56, and the flow restriction means 46, 48, and 50.

After this relatively high flow rate of ink has been established through the print head 10, valve 72 is actuated, as indicated in Step No. 4, thus rapidly terminating the ink flow through the print head. As a consequence, a sudden pressure impulse is imparted to the ink in print head 10, producing a rapid flow of ink through the print head orifices and establishment of the desired jet drop streams.

Once the jet drop streams are established, the flow rate of ink supplied to the print head 10 through the supply line 56 is reduced by deactuating valve 54 as seen in Step No. 5. Valve 72 remains actuated and, therefore, there is no flow out of the print head 10 through the print head return line 68. Further, bleed valves 74 and 76 are actuated such that ink is supplied from the pump outlet 26 to the side of the print head outlet valve 72 opposite the print head 10 through valves 74 and 76 and bleed restriction 80. Actuation of valves 74 and 76 fills a portion of the print head return line 68 which extends between valves 72 and 74. It should be appreciated that previously the entire return line 68 has been drained of ink upon actuation of valve 72 in Step No. 4, since the print head return line 68 terminates above the surface of the ink 17 in supply tank 16.

Next, as seen in Step No. 6, valve 72 is deactuated. No fluid flow through the outlet of the print head 10 occurs at this point, however, since ink from the pump means 22 is supplied to both sides of the print head 10. Subsequently, as shown in Step No. 7, valve 76 is deactuated with the result that a cross-flow of fluid through the print head 10 occurs, with ink from the print head supply line means 56 passing through the print head 10, valve 72, valve 74, bleed restriction 80, and ultimately being returned to the supply tank 16. The flow rate of ink passing through print head 10 is further limited by bleed restriction 80. The bleeding operation eliminates any air from the print head 10 which may have accumulated therein.

It is desirable that at least a portion of the print head return line means 68 be filled with ink prior to deactuating valve 72 before the bleed cycle begins in order to limit the amount by which the fluid pressure within the print head 10 drops upon reopening valve 72. Since the flow rate of the ink leaving the print head 10 is limited by bleed restriction 80 and, further, since the print head return line means 68 is filled with ink between the print head 10 and the restriction 80, the drop in pressure within the print head 10 which does occur upon deactuating valve 72 is not sufficiently severe to interfere with the flow of the jet drop streams from the print head 10. If air were to fill the print head return line 68 completely, however, the air within the line 68 would become rapidly compressed upon deactuation of valve 72 and a pressure drop would occur within the print head 10 which would have a deleterious effect upon production of the jet drop streams, possibly causing the streams to become unstable and various printer elements to be wetted by the streams.

After bleeding of the print head 10 is completed, the print head outlet valve 72 is once again actuated, terminating flow of ink from the print head to the tank 16 via the print head return line means 68, as illustrated in Step No. 8. Valve 74 is then deactuated, as shown in Step No. 9, and the printer is now operated in a printing mode.

When the printing operation is completed, shut down of the printer is initiated, as seen in Step No. 10, by actuating print head inlet valve 60 and simultaneously, deactuating print head outlet valve 72. The result is that the inlet side of the print head 10 is momentarily vented to atmosphere, while the outlet side of the print head is connected to the evacuated supply tank 16 via the print head return line means 68. The ink within the print head 10 undergoes an extremely rapid drop in fluid pressure and the flow of ink through the print head orifices is quickly terminated, producing a rapid, clean cessation of jet drop stream flow.

Next, as indicated at Step No. 11, valve 52 is deactuated causing the ink supplied to the recirculation means 38 to be routed through the third ink return line 44 and the circulate flow restriction means 50. Finally, print head inlet valve 60 is again deactuated as shown in Step No. 12, resulting in a return to the circulate/shut down mode of operation in which ink is passed through the print head 10 at a relatively low flow rate and pressure.

It may be desired to turn off the vacuum pump 18 during extended periods of shut down. It is preferable to vent tank 17 to atmosphere at a slow rate prior to terminating operation of pump 18 to prevent a pressure pulse from passing through line 68 to reservoir 11. It will be appreciated that such a pressure pulse might otherwise cause weeping of ink through orifices 13.

When the print head 10 is to be replaced with another print head, the inlet valve 60 is actuated with the other valves in their respective shut down positions, as shown in Step No. 13. This results in fluid removal from the print head and allows the inlet and outlet lines of the print head to be disconnected and a new print head installed without spillage of fluid onto other printer elements.

It will be appreciated that the present invention provides a unique ink jet printer in which the start up, bleed, print, and shut down and print head removal operations are effectively controlled. By providing continuous circulation of ink through the print head during periods of printer shut down at a pressure which precludes weeping of the ink through the print head orifices, the shut down and start up operations are simplified while preventing drying of ink or deposit of contaminants in the print head.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink jet printer, comprising:

a print head including a fluid receiving reservoir, and an orifice plate defining at least one orifice communicating with said reservoir for providing ink flow through said orifice to form a jet drop stream for printing, fluid supply means, including an ink supply tank, and pump means connected to said ink supply tank, print head supply line means for providing flow of ink from said fluid supply means to said fluid receiving reservoir of said print head, print head return line means for returning ink from said fluid receiving reservoir of said print head to said fluid supply means, and control means for controlling the flow of ink supplied to said print head by said fluid supply means to provide a flow of ink at a predetermined flow rate during printing and to provide a substantially reduced continuous flow of ink from said print head supply line means to said print head return line means through said reservoir at substantially reduced fluid pressure during periods in which said printer is shut down and a jet drop stream is not produced by said print head, whereby ink is continuously circulated through said print head without weeping of ink through said orifice, drying of ink adjacent said orifice or deposit of contaminants within said reservoir.

2. The ink jet printer of claim 1 in which the fluid pressure of the ink within said fluid receiving reservoir is less than 0.5 psia during printer shut down.

3. The ink jet printer of claim 1 in which the fluid flow rate of ink through said print head is on the order of 0.02 gallons per minute during printer shut down.

4. A method of shutting down an ink jet printer of the type having a print head including an ink receiving reservoir and an orifice plate defining at least one orifice communicating with said reservoir, a jet drop stream being produced by ink flow through said orifice when ink is supplied to said reservoir at a predetermined pressure, comprising the steps of reducing the fluid pressure in said reservoir below said predetermined pressure such that ink does not flow through said orifice, thereby terminating formation of said jet drop stream, and providing continuous flow of ink through said reservoir during periods of time in which a jet drop stream is not produced by said print head, whereby contaminants in said ink do not settle within said reservoir and ink is prevented from drying in the region of said orifice, thereby preventing said orifice from becoming clogged.

5. The method of shutting down an ink jet printer according to claim 4 in which said step of reducing the fluid pressure in said reservoir includes the step of reducing the fluid pressure in said reservoir to 0.5 psia or less.

6. The method of shutting down an ink jet printer according to claim 4 in which the step of providing continuous flow of ink through said reservoir includes the step of providing an ink flow through said reservoir of approximately 0.02 gallons per minute.

7. The method of shutting down an ink jet printer according to claim 4 in which said continuous flow of ink through said reservoir is maintained in a direction substantially normal to the direction of fluid flow through said orifice.

8. The method of shutting down an ink jet printer according to claim 4 in which the step of providing a continuous flow of ink through said reservoir includes the step of continuously recirculating ink through said reservoir from a fluid supply means, whereby contaminants remain entrained in said ink and do not clog said orifice.

9. A method of supplying ink to the print head of a printer for producing a plurality of jet drop streams during printing, said streams emanating from orifices communicating with a fluid reservoir in said print head, and for thereafter shutting down said printer and terminating production of said jet drop streams, said printer including a print head supply line to the print head including a print head inlet valve, a print head return line from the print head to an ink supply tank, said print head return line including a print head outlet valve, and a pump having a pump outlet connected to said print head supply line and a pump inlet connected to said ink supply tank, comprising the steps of providing ink to said print head from said pump during printing at a predetermined fluid flow rate, with said print head inlet valve open and said print head outlet valve closed to produce said jet drop streams, and continuously providing ink to said print head from said pump during periods of printer shut down at a fluid flow rate less than said predetermined fluid flow rate, with said print head inlet valve open and said print head outlet valve open to produce continuous fluid flow through said fluid reservoir at a reduced fluid pressure, whereby ink is prevented from flowing through said orifices and contaminants remain entrained in said ink.

* * * * *